US007789310B2

(12) United States Patent
Butikofer

(10) Patent No.: US 7,789,310 B2
(45) Date of Patent: Sep. 7, 2010

(54) MEDIA IDENTIFICATION

(75) Inventor: Chet M. Butikofer, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1835 days.

(21) Appl. No.: 10/879,542

(22) Filed: Jun. 29, 2004

(65) Prior Publication Data

US 2005/0286915 A1 Dec. 29, 2005

(51) Int. Cl.
*G06K 19/00* (2006.01)

(52) U.S. Cl. ........................ 235/487; 235/375; 235/494; 399/16; 399/361

(58) Field of Classification Search ................. 235/487, 235/375, 494; 270/52.02; 399/16, 361
See application file for complete search history.

(56) References Cited

U.S. PATENT DOCUMENTS 4,352,554 A * 10/1982 Kaye et al. .................... 355/40
4,469,320 A 9/1984 Wenthe, Jr.
4,734,747 A 3/1988 Okuda et al.
4,788,571 A 11/1988 Ura et al.
4,949,999 A * 8/1990 Ke-hui ........................ 283/38
4,960,272 A 10/1990 Wierszewski et al.
4,970,544 A 11/1990 Furusawa et al.
5,078,378 A 1/1992 Kapadia et al.
5,085,417 A * 2/1992 Copham .................... 270/1.02
5,104,111 A 4/1992 Matsuda et al.
5,152,515 A 10/1992 Acquaviva
5,347,350 A 9/1994 Nakahata et al.
5,360,207 A 11/1994 Rauen et al.
5,467,182 A 11/1995 Hower, Jr. et al.
5,717,976 A * 2/1998 Chowdry et al. .............. 399/45
5,839,015 A 11/1998 Faguy et al.
6,335,084 B1 * 1/2002 Biegelsen et al. ........... 428/192
6,604,875 B2 8/2003 Meunier et al.
6,874,774 B2 * 4/2005 Todie ........................ 270/5.02
2003/0016980 A1 * 1/2003 Meunier et al. ............... 400/76
2003/0072019 A1 * 4/2003 Haines et al. ............. 358/1.12

* cited by examiner

*Primary Examiner*—Michael G Lee
*Assistant Examiner*—Ali Sharifzada

(57) ABSTRACT

A media includes a set of adjacent edges of material and a segment along only a portion of the set of edges. The segment has a first identifiable end and a second identifiable end.

22 Claims, 3 Drawing Sheets

FIG. 5A
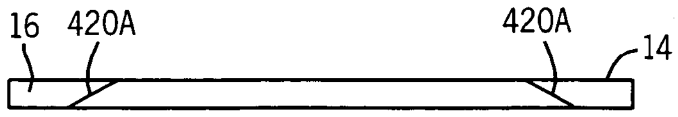
FIG. 5B
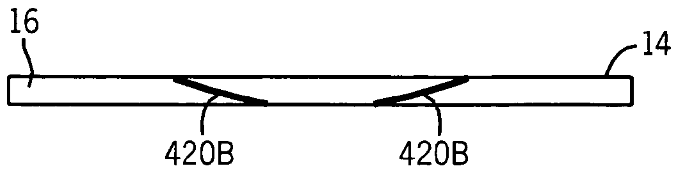
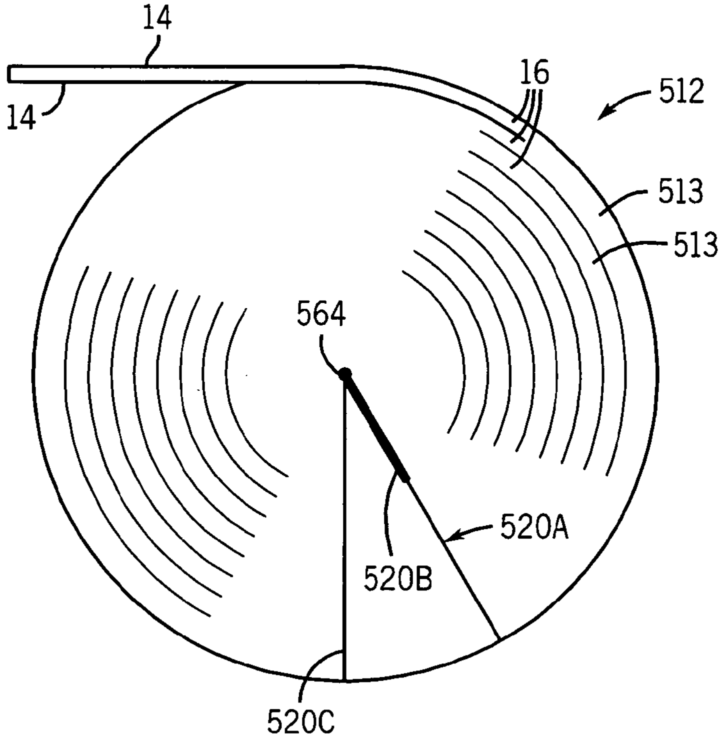
FIG. 6
FIG. 6A
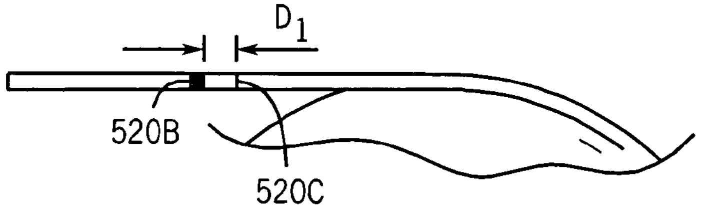
FIG. 6B
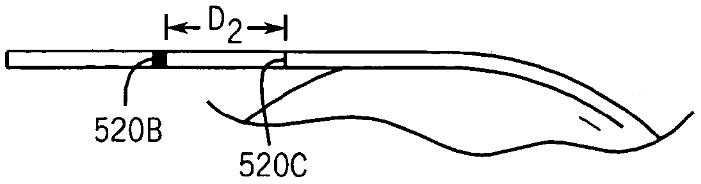

MEDIA IDENTIFICATION

BACKGROUND

Media is commonly supplied in either reams or stacks of individual sheets or as a roll. During its use, the media is fed to the device that interacts with the media, such as a printer or a scanner. Malfunctions, such as jams, often occur during the feeding of media. In many instances, such malfunctions are the result of the quantity of print media being at a certain level. Such malfunctions are frequently difficult to remedy and cause prolonged delays.

BRIEF DESCRIPTION OF THE DRAWINGS

FIG. 5A is a greatly enlarged side elevational view of a first portion of the media of FIG. 5.

FIG. 5B is a greatly enlarged side elevational view of a second portion of the media of FIG. 5.

FIG. 6 is aside elevational view of a fifth embodiment of the media of FIG. 1.

FIG. 6A is a greatly enlarged fragmentary side elevational view of a first portion of the media of FIG. 6.

FIG. 6B is a greatly enlarged fragmentary side elevational view of a second portion of the media of FIG. 6.

DETAILED DESCRIPTION OF EXAMPLE EMBODIMENTS

Figure 1:
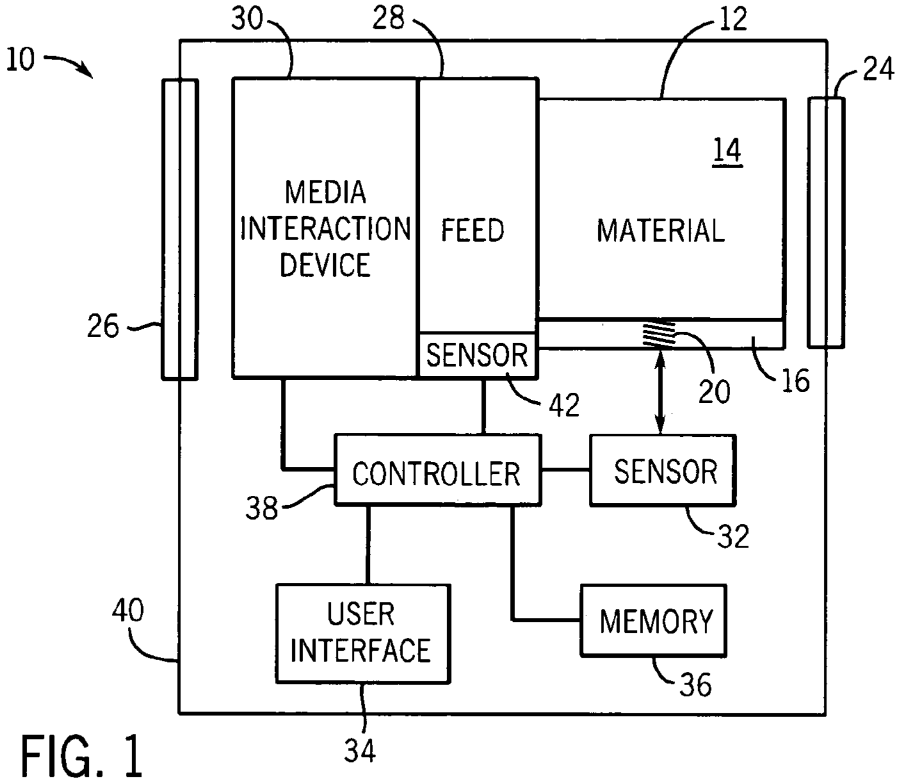
FIG. 1 is a schematic illustration of a media interaction system interacting with a media.

FIG. 1 is a schematic illustration of one example of a media interaction system 10. Media interaction system 10 is configured to interact with media 12 (schematically illustrated) provided by material having a plurality of adjacent faces 14 terminating at a plurality of adjacent edges 16. In one embodiment, media 12 may comprise a plurality of adjacent sheets of material arranged in a stacked relationship such that edges 16 extend adjacent to one another. Such sheets of material may comprise distinct, separated sheets or may comprise sheets which are partially or completely connected to one another along junction lines which also extend along the edges of the faces 14. For example, such sheets of material may be partially connected to one another along perforations, wherein the sheets are folded so as to position their edges adjacent to one another. In another embodiment, media 12 may comprise a roll of material, wherein faces 14 are circumjacent one another and wherein edges 16 extend about an axis of the roll.

As further shown by FIG. 1, media 12 additionally includes a plurality of segments 20 along edges 16. Segments 20 are configured to enable individual edges 16 to be distinguished from one another by evaluation of segments 20. Each segment 20 generally comprises an elongate continuous mark which continuously spans or extends across a plurality of adjacent edges 16. Each segment 20 obliquely extends relative to faces 14. In one embodiment, each segment 20 is generally linear. In another embodiment, one or more of segments 20 is curved or arcuate.

In one particular embodiment, each segment is formed by applying a material to edges 16 while faces 14 extend parallel to one another, wherein the marking material is distinct from the material of media 12 providing faces 14 and edges 16. In one particular embodiment, the marking material may have a different color than the material providing edges for faces 14 and edges 16. In another embodiment, the marking material may comprise or may have a distinct chemical composition or a distinct texture as compared to the material providing faces 14 and edges 16. In still another embodiment, segments 20 may be formed by removing portions of the material providing faces 14 and edges 16 rather than adding marking material. In particular embodiments, segments 20 may be formed during the formation of the material providing faces 14 and edges 16.

In addition to enabling the identification of and distinguishing of individual edges 16 or material of media 12, segments 20 may also be configured to assist users or individuals in loading input 24 with media 12 or in visually determining a quantity of media 12. Segments 20 may be configured so as to have visually distinguishable ends between outer most edges 16. In one embodiment, segments 20 extend along arcuate or linear lines so as to not intersect one another and so as to have distinct end points. In another embodiment, segments 20 have distinct colors. In yet another embodiment, segments 20 extend along a common arcuate or linear line such that segments 20 are contiguous with one another, wherein segments 20 are distinguishable from one another by differing thicknesses. In still another embodiment, segments 20 may have distinct end points and have distinct thicknesses. Because segments 20 are visually distinguishable from one another along edges 16, segments 20 demarcate predefined quantities of media 12. For example, segments 20 applied to sheets of media 12 may be used to visually indicate to a user (without requiring the user to use a sensor or other device) a predetermined quantity of sheets of media 12 to assist the individual in loading media 12 into device 10 or to assist the individual in determining whether a sufficient quantity of media 12 exists for a particular job. In another application, segments 20 formed on a roll of media 12 may also be used to assist an individual to visually determine (without the use of a sensor or other electronic device) whether a sufficient quantity of the roll of media 12 exists for a particular job. In particular applications, segments 20 may alternatively be substantially identical to one another and not visually distinguishable from one another, wherein the sole purpose of segments 20 is to enable individual edges 16 to be distinguished from one another for evaluation.

Media interaction system 10 interacts with media 12 and generally includes input 24, output 26, feed 28, media interaction device 30, sensor 32, controller 38, user interface 34, and memory 36. Input 24 comprises one or more structures configured to receive media 12 and to store media 12 until portions of media 12 are interacted upon by device 30. In one embodiment, input 24 may comprise a tray configured to store and contain media 12. In another embodiment, input 24 may comprise a reel configured to support a roll of media 12. The exact configuration of input 24 may be varied depending upon the configuration of media 12.

Output 26 comprises one or more structures through which interacted upon media 12 is ejected from system 10. In one particular embodiment, output 26 may comprise a tray for storing interacted upon media ejected from system 10. In another embodiment, output 26 may simply comprise a slot or opening formed within housing 40 of system 10 which encloses each of the components of system 10.

Media feed 28 comprises a mechanism configured to transport media 12 from input 24 to media interaction device 30. In one embodiment, feed 28 may additionally be configured to move media 12 relative to media interaction device 30 as device 30 interacts with the media 12. In particular embodiments, media feed 28 may include one or more motors communicating with and under the control of controller 38, wherein the one or more motors drives an arrangement of belts, pulleys, rollers and the like to drive and move media 12 along a media path from input 24, across interaction device 30 and to output 26.

Media interaction device 30 comprises a device configured to interact with media 12 in one or more fashions. In one embodiment, media interaction device 30 is configured to form an image upon faces 14 of media 12. For example, in one embodiment, media interaction device 30 may include one or more inkjet printheads in communication with and under the control of controller 30 which dispense ink or other fluid upon faces 14. In one embodiment, media interaction device 30 may include an array of stationary printheads. In another embodiment, media interaction device 30 may include one or more printheads which are moved relative to faces 14 of media 12 by a carriage in communication with and under the control of controller 38. In still another embodiment, media interaction device 30 may comprise an electrophotographic printing system (laser printer) which includes a photoconductive drum and which applies dry or liquid toner to faces 14 of media 12. In still other embodiments, media interaction device 30 may be configured to form images upon faces 14 using other printing or image-forming technology.

In still other embodiments, media interaction device 30 may alternatively be configured to scan or read data or images from surfaces 14 of media 12.

Sensor 32 comprises a device configured to interact with edges 16 of media 12 to identify the particular edges 16 of media 12 using segments 20. In one particular embodiment, sensor 32 includes one or more light emitting diodes which emit light towards edges 16 and one or more photo diode sensors which sense reflected light from edges 16. In such an embodiment, sensor 32, comprising an optical sensor, detects variations in the absorption of light by portions of edges 16 including segments 20 and those portions of edges 16 which do not include segments 20. In other embodiments, sensor 32 may alternatively be configured to detect variations in magnetic, chemical or other attributes of portions of edges 16 which include segments 20 and other portions of edges 16 which do not include segments 20. In one particular embodiment, sensor 32 is configured to sense segments 20 upon edges 16 prior to media 12 being moved by feed 28. In another embodiment, sensor 32 may be configured to sense segments 20 upon edges 16 as media 12 is being moved by feed 28 or during interaction with media 12 by device 30. In still another embodiment, sensor 32 may be configured to sense segments 20 upon edges 16 as media 12 is located in other portions of a media path between input 24 and output 26.

User interface 34 comprises a device configured to interface or interact with a user of system 10. User interface 34 is in communication with and under control of controller 38. In one embodiment, user interface 34 includes a visual display such as a monitor or screen. In another embodiment, user interface 34 may communicate with a user through audible sounds or signals. In one embodiment, user interface 34 is contained and supported by housing 40 of system 10. In another embodiment, user interface 34 may comprise a distinct monitor or sound device from the remainder of system 10 within housing 40, wherein interface 34 communicates either through wires or wirelessly with controller 38. In particular embodiments, user interface 34 may further be configured to receive input from a user. User interface 34 provides information to a user of system 10 in response to control signals generated by controller 38 based upon signals or data received from sensor 32.

Memory 36 is configured to store information or data received from controller 38. Memory 36 may comprise one or more of programmable readable memory, non-erasable read-only memory or random access memory. Memory 36 may comprise digital memory in the form of a hard-wired circuitry or may comprise fixed or portable memory such as optical memory (e.g., CDs, DVDs), magnetically encodable memory (e.g., tape, floppy disk), or other forms.

Controller 38 comprises a processor in communication with feed 28, interaction device 30, sensor 32, user interface 34 and memory 36. For purposes of this disclosure, the term "processor" shall mean shall mean a conventionally known or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 38 is not limited to any specific combination of hardware circuitry and software, nor to any particular source for the instructions executed by the processing unit. Controller 38 receives signals from sensor 32 corresponding to individual edges 16 detected by sensor 32. Controller 38 generates control signals which cause user interface 34 to provide quantity information regarding media 12. In one embodiment, controller 38 generates control signals which cause user interface 34 to indicate a quantity of media 12 (e.g., number of sheets, length of roll, amount of surface area) remaining by input 24 and within system 10 or the quantity of media 12 which has been consumed during a particular print job or scanning job or from a certain point in time. Controller 38 may also be configured to generate control signals which cause user interface 34 to alert a user to the improper media quantity. For example, controller 34 may generate control signals which cause user interface 34 to alert or notify a user that an insufficient quantity of media 12 exists for a desired printing or scanning task or that media supply 24 contains an excessive quantity of media 12 for proper operation of system 10.

In yet another embodiment, controller 38 additionally or alternatively is configured to generate control signals in response to receiving data or information from sensor 42 relating to a malfunctioning of system 10, wherein controller 38 identifies individual edges 16 which are being manipulated by feed 28 or which are being interacted by device 30 during the malfunction. Controller 38 generates control signals which cause user interface 34 to identify to the user the particular edge or portion of media 12 which may have caused the malfunction. Additionally or alternatively, controller 38 further stores the identified portion of media 12 during which the malfunctioning occurred in memory 36. This stored information correlating the malfunctioning of system 10 to particular portions of media 12 being transported or interacted upon may be used by controller 38 to diagnose and evaluate causes for malfunctioning of system 10. For example, in one embodiment, sensor 42 may be configured to detect paper jams within feed 28. During a particular paper jam, controller 38 identifies the particular portion of media 12 (i.e., a particular sheet or a particular portion of a roll) which was being handled by feed 28 during the jam. This information is stored in memory 36. Controller 38 may be configured to analyze data collected over time to identify patterns or trends. For example, based upon such information, controller 38 may determine that paper jams more frequently occur with a particular portion of media 12 (i.e., a particular sheet or a particular portion of a roll). Controller 38 may further be configured to adjust the control and operation of feed 28 or system 10 to adapt to the particular edge 16 and portion of media 12 being transported or interacted upon in the future to prevent future paper jams or future malfunctions. Alternatively, controller 38 may be configured to provide such information which is evaluated by separate or distinct processors.

Figure 2:
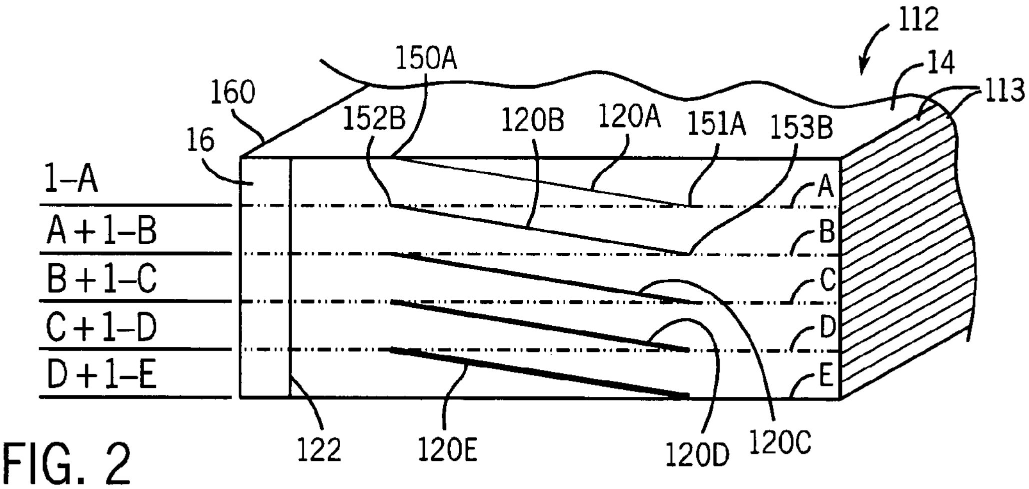
FIG. 2 is a fragmentary top perspective view of one embodiment of the media of FIG. 1.

FIG. 2 is a top perspective view of media 112, a particular example of media 12 shown in FIG. 1, having segments 120A, 120B, 120C, 120D and 120E and additionally including segment 122. Media 112 comprises a stack or ream of sheets 113 of material (which are schematically shown) having faces 14 and individual edges 16. Segments 120A, 120B, 120C, 120D and 120E extend along edges 16 oblique to faces 14. As shown by FIG. 2, segment 120A has a first end 150A at an upper most edge 16 and a second opposite end 151A along sheets 113 such that segment 120A extends along sheet 1 through sheet A. Segment 120B extends from a first end 152B to end 153B. End 152B terminates along edge 16 of sheet A+1 while end 153 terminates along edge 16 of sheet No. B. In a similar fashion, segments 120C, 120D and 120E extend along distinct portions of edges 16 of media 112. Segment 120C extends from sheet No. B+1 to sheet No. C. Segment 120D extends from sheet No. C+1 to sheet D. Segment 120E extends from sheet D+1 to sheet No. E. In the particular embodiment shown, segments 120A-120E extend parallel to one another and have an identical length such that each segment represents a common predetermined number of sheets 113 of media 112. In other embodiments, segments 120A-120E may have distinct lengths and may not extend parallel to one another so that segments 120A-120E identify different quantities of sheets 113. As a result, segments 120A-120E enable a user, looking along edges 16, to quickly and easily identify a predetermined number or quantity of sheets 113. For example, in one embodiment, segment 120A has a length and extends at an angle so as to extend along 50 sheets 113, enabling a user to identify end 151A and separate 50 or substantially 50 sheets 113 from a stack of sheets 113. As a result, segments 120A-120E enable a user to load a proper amount or quantity of media 112 within input 24 (shown in FIG. 1). Segments 120A-120E also enable a user to quickly and easily determine the quantity of sheets 113 or of media 112 remaining in an open pack or bundle of sheets by simply looking at segments 120A-120E along edges 16.

At the same time, segments 120A-120E further enable individual edges 16 of individual sheets 113 to be distinguished from one another by sensor 32 (shown in FIG. 1). Because each of segments 120A-120E extends oblique to faces 114, each of segments 120A-120E forms a distinctly located mark along edge 16. In particular, each sheet 113 will have marks along edge 16 at a unique distance from segment 122 and from side 160 of the sheet 113. Sensor 32 detects the varying distance from either or both of segment 122 or side 160 to identify each individual sheet 113.

Figure 2A:
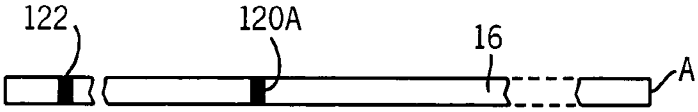
FIG. 2A is a greatly enlarged side elevational view of a first portion of the media of FIG. 2.
Figure 2B:
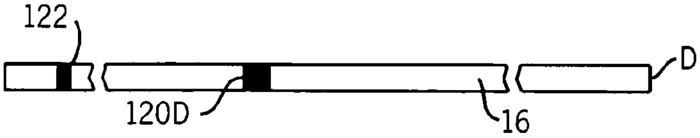
FIG. 2B is a greatly enlarged side elevational view of a second portion of the media of FIG. 2.

As further shown by FIG. 2, segments 120A-120E each overlap one another in a direction perpendicular to faces 14, such that sheets along segments 120A-120E will have identically located marks upon their edges 16. However, because segments 120A-120E have distinct thicknesses, the marks will also have distinct thicknesses. FIGS. 2A and 2B are greatly enlarged side elevational views of particular sheets 113 of media 112. FIG. 2A illustrates sheet no. A. FIG. 2B illustrates sheet no. D. Since segment 120D has a greater thickness than segment 120A, the mark of segment 120D along edge 16 of sheet no. D has a greater thickness as compared to the mark formed by segment 120A along edge 16 of sheet no. D. These varying thicknesses enable sensor 32 to distinguish sheets 113 having identically located marks formed by different segments.

Figure 3:
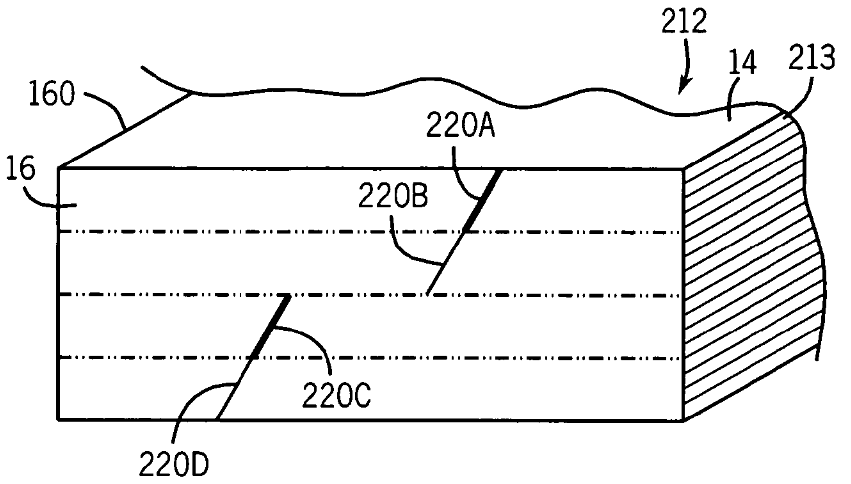
FIG. 3 is a fragmentary top perspective view of a second embodiment of the media of FIG. 1.

FIG. 3 is a top perspective view of media 212, another embodiment of media 12 shown in FIG. 1. Media 212 consists of a stack or ream of sheets 213 having faces 14 and edges 16. Media 212 further includes segments 220A, 220B, 220C and 220D along edges 16. Segments 220A-220D extend oblique to faces 14. Segments 220A-220D do not overlap one another in a direction perpendicular to faces 14. As a result, segments 220A-220D enable sensor 32 to distinguish individual edges 16 and individual sheets 213 from one another based upon the location of the mark or portion of segments 220A-220D along a particular edge 16. As shown by FIG. 3, segments 220A, 220B, 220C and 220D each have at least one visually distinguishable end point located between upper most and lower most sheets 213. As a result, segments 220A-220D additionally enable a user or individual to identify a predefined quantity of sheets 213 of media 212. Although segments 220A and 220B extend contiguous with one another and although segments 220C and 220D also extend contiguous with one another, such segments have visually distinct end points due to their differing thicknesses. In one embodiment, each of segments 220A-220D may extend along a common contiguous line, wherein segments 220A-220D each have distinct thickness compared to adjacent segments.

Figure 4:
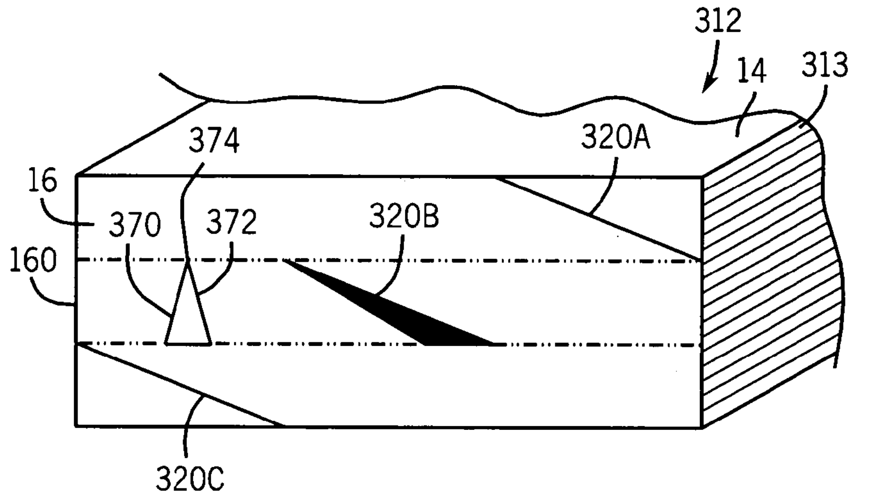
FIG. 4 is a fragmentary top perspective view of a third embodiment of the media of FIG. 1.

FIG. 4 is a top perspective view of media 312, another embodiment of media 12 shown in FIG. 1. Media 312 includes a plurality of sheets 313 having faces 14 and edges 16. Media 312 further includes segments 320A, 320B and 320C extending along edges 16. Segments 320A-320C are arranged so as to not overlap one another in a direction perpendicular to faces 14. Because segments 320A-320C extend oblique to faces 14 and do not overlap one another in a direction perpendicular to faces 14, segments 320A-320C enable each individual sheet 313 of media 312 to be distinguished from the remaining sheets 313 of media 12 based upon the unique location of its mark along edge 16 formed by one of segments 320A-320C. In addition, because each of segments 320A-320C has at least one visually identifiable end point between the upper most sheet 313 and the lower most sheet 313, segments 320A-320C further demarcate a predefined quantity or number of sheets 313. As a result, a user may quickly and easily separate a predefined quantity or subset of the total number of sheets 313 for loading into system 10.

As shown by FIG. 4, segment 320B has a varying thickness along its length. In particular, segment 320B widens as it approaches a bottom of media 312. As a result, segment 320B will have a distinct thickness or width on each individual sheet along which segment 320B extends. In lieu of distinguishing individual sheets 313 from one another based upon a distance of a particular portion of segment 320B from the edge 160 of media 312, individual sheets 313 may also be distinguished from one another by the unique thickness of segment 320B along each sheet. Although segment 320B is illustrated as extending along a predefined quantity or a number of sheets 313, segment 320B may alternatively extend along the entire ream or stack of media 312, wherein individual sheets 313 of the entire stack or ream of media 312 may be distinguished from one another based upon the thickness of a particular portion of segment 320B on each sheet 313.

FIG. 4 further illustrates an alternative identification system. In particular, FIG. 4 illustrates segments 370 and 372. Segments 370 and 372 comprise marks formed along edge 16 along at least a portion of the stack of media 312. Segments 370 and 372 converge towards one another. In the particular embodiment illustrated, segments 370 and 372 converge together at a point 374. Like segments 320A, 320B and 320C, segments 370 and 372 enable individual sheets 313 to be distinguished from one another by sensor 32 (shown in FIG. 1) based upon their unique position or location relative to edge 160 or based upon their unique spacing from one another. Like segments 320A, 320B and 320C, segments 370 and 372 have visually identifiable end points between end most sheets 313, enabling a person to quickly and easily separate a predefined quantity or subset of the total number of sheets 313 for loading into system 10. In addition, segments 370 and 372 also communicate a suggested loading orientation of media 312. In particular embodiments, media 312 may include sheets 313 having opposite faces 14 with distinct characteristics. For example, each sheet 313 may have a particular face 14 in which a watermark is properly viewed (i.e., not inverted). Sheets 313 may have a particular characteristic curl, such that interaction with sheets 313 is improved when a particular face 14 of each sheet 313 faces upward or downward. In particular applications, one or both faces 14 of each sheet 313 may include preprinted images or text wherein the particular orientation of each sheet (up or down, left or right) is important for the proper interaction (printing upon, scanning and the like) with each sheet 313 by system 10. Segments 370 and 372 form an arrow or other symbol which communicates to the person a suggested directional orientation of media 312.

Although segments 370 and 372 are illustrated as communicating an up or down direction of media 312, segments 370 and 372 may alternatively be reoriented 90 degrees so as to point to a side of media 312, such as one of edges 160, in those applications where interaction with media 312 and the performance of system 10 is sensitive to the location of edge 160 when media 312 is loaded into system 10. Although segments 370 and 372 are illustrated as extending along a predefined quantity of sheets 313 of media 312, segments 370 and 372 may alternatively extend along an entirety of edge 16. Although segments 370 and 372 are illustrated as being used in conjunction with segments 320A, 320B and 320C, segments 370 and 372 may alternatively be utilized with a fewer number of such segments 320A, 320B, 320C or alone along edge 16. Although two segments are illustrated as pointing in a particular direction along edge 116, a single segment having a varying thickness (so as to form a point or triangle) may alternatively be used to communicate a suggested orientation of media 312.

Figure 5:
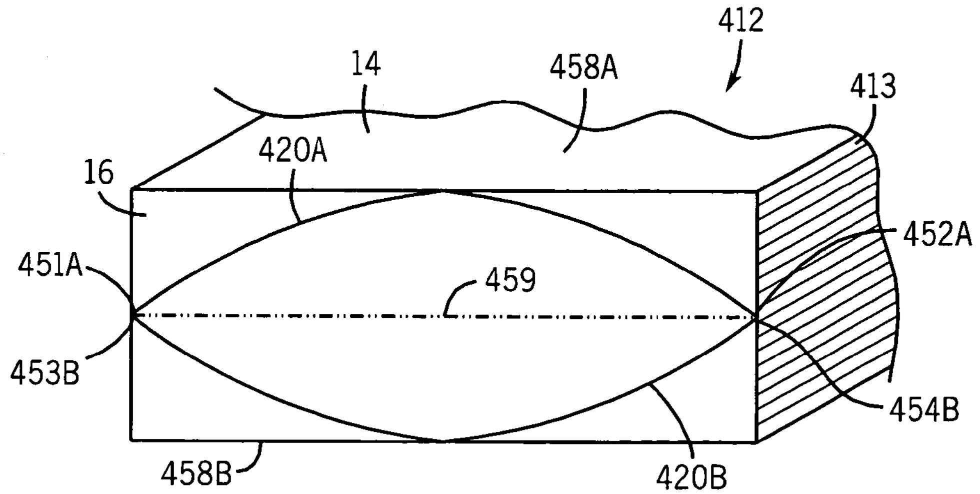
FIG. 5 is a fragmentary top perspective view of a fourth embodiment of the media of FIG. 1.

FIG. 5 is a top perspective view of media 412 including a stack or ream of individual sheets 413 having faces 14 and edges 16. Media 412 additionally includes segments 420A and 420B. Segments 420A and 420B arcuately extend along edges 16 with their end points converging along two adjacent sheets 413. As shown by FIG. 5, segment 420A has visually distinguishable end points 451A and 452A while segment 420B has visually distinguishable end points 453B and 454B between the end most sheets 413. As a result, segments 420A and 420B demarcate or divide the stack of sheets 413 of media 412 into two distinct subsets or portions 458A and 458B (separated by dashed line 459).

FIG. 5A is a greatly enlarged side elevational view of an individual sheet 413 having two portions of segment 420A along its edge 16. FIG. 5B is a greatly enlarged side elevational view of an individual sheet 413 of subset 458B having two spaced portions of segment 420B along its edge 16. As shown by FIGS. 5A and 5B, segments 420A and 420B also uniquely identify each sheet 413. Each sheet 413 has a unique set or pair of portions of either segment 420A or 420B. Each sheet 413 may be uniquely identified by the unique spacing between the pair of individual marks or portions of segment 420A, 420B along edge 16 or the unique shape or slope of the particular marks or portions of segments 420A, 420B. As further shown by FIG. 5, one of segments 420A, 420B may additionally or alternatively be provided with a greater thickness as compared to the other of segments 420A, 420B. As a result, those segments 420A, 420B upon subsets 458A and 458B that have identical spacing between their respective portions may be visually distinguished from one another based upon either the unique shape or slope of their respective portions or based upon the distinct thicknesses of segments 420A, 420B.

FIGS. 6, 6A and 6B illustrate media 512, another embodiment of media 12 shown in FIG. 1. Media 512 comprises a roll of material having windings 513 with faces 14 and adjacent edges 16. As shown by FIG. 6, media 512 additionally includes segments 520A, 520B and 520C which extend along edges 16. Segments 520A, 520B and 520C extend oblique to faces 14. In the particular embodiment shown, edges 520A and 520B continuously extend from a radially outer most edge 16 to a center most edge 16. Segment 520C extends from a radially outer most edge 16 to a center most edge 16 and converges with segment 520C. In other embodiments, segments 520A, 520B and 520C may converge towards one another but not actually meet. Because segments 520A, 520B and 520C converge towards one another, each edge 16 of each winding 513 has a unique spacing between the individual marks or portions of segments 520A, 520B and 520C. The unique spacing enables sensor 32 to identify the particular windings or portions of media 512 and to distinguish such windings from one another. For example, FIG. 6A illustrates an inner winding 513 of media 512 in which segments 520B and 520C are spaced by a distance $D_1$. FIG. 6B illustrates a more outer winding 513 of media 512 in which segments 520B and 520C are spaced by a greater distance $D_2$. In a similar fashion, each other winding 513 and media 512 will have a different spacing between segments 520B and 520C or between segments 520A and 520C.

As further shown by FIG. 6, segments 570 and 572 have distinct thicknesses such that segments 570 and 572 each include at least one end point between the radial inner most and radial outer most windings 513. Because these end points are visually distinguishable, segments 570 and 572 enable individuals or users to quickly and easily identify the number of windings and/or quantity of media 512 remaining on a particular roll or reel without the need for electronic sensors or other devices. Each of segment 520A and 520B has a length corresponding to a predetermined number of windings 513 or a predetermined length of media 512. In another embodiment, segment 520B may be omitted, wherein segment 520A extends to an inner most winding 513. In still another embodiment, edges 16 of media 512 may include additional segments used solely for the purpose of visually distinguishing distinct subsets or quantities of media 512 or windings 513.

Overall, the segments provided on edges 16 of media 12, 112, 212, 312, 412 and 512 visually demarcate to a user predefined quantities of the media such that the individual can quickly, easily and with relatively good accuracy separate out or divide the media into distinct quantities of less than the entire quantity for loading into input 24 of system 10. As a result, media 12, 112, 212, 312, 412 and 512 assist in the prevention of overloading of input 24 which cause system 10 to malfunction or may cause jamming of the media within system 10. The segments along edges 16 of the media also enable the user to quickly determine with relatively accuracy the quantity of media remaining available for use. At the same time, the segments employed along edges 16 of media 12, 112, 212, 312, 412 and 512 also enable sensor 32 to individually identify particular portions, such as individual sheets or individual windings, of the media. As a result, media 12, 112, 212, 312, 412 and 512 also enable controller 38 to alert the users of system 10 as to the quantity of media remaining within system 10 and to track and diagnose malfunctions of system 10 which may be caused by media passing through system 10. Based upon such diagnosis, users may split stacks or reams of media to reduce malfunctions such as feeding or jamming issues.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the above definitions is manifestly intended to be as broad as possible. For example, unless specifically otherwise noted, the definitions reciting a single particular element also encompass a plurality of such particular elements.

What is claimed is:

1. A media comprising:

sheets of material providing a set of adjacent edges of sheets of material arranged in a stack, the stack having a topmost sheet and a bottommost sheet, the sheets having faces terminating along the edges;

a first segment extending oblique to the faces and along only a first portion of the set of edges and having a first identifiable end and a second identifiable end, the second identifiable end spaced from both the topmost sheet and the bottommost sheet;

a second segment having a first identifiable end and a second identifiable end along a second portion of the set of edges, wherein each sheet of the first portion and the second portion includes only one of either the first segment or the second segment, wherein the first segment has a first thickness and the second segment has a second thickness different than the first thickness; and a plurality of segments including the first segment and the second segment, wherein the plurality of segments collectively extend from the topmost sheet to the bottommost sheet and wherein none of the plurality of segments overlap in a direction parallel to the faces of the sheets.

2. A media comprising:

sheets of material arranged in a stack having a topmost sheet and a bottommost sheet, the stack having a set of adjacent faces terminating at a set of adjacent edges;

a plurality of segments including a first segment and a second segment, the first segment extending along the edges oblique to the faces and having a first identifiable end and a second identifiable end; and the second segment extending along the edges oblique to the faces and having a first identifiable end and a second identifiable end, wherein the material includes sheets providing the set of faces and the set of edges, wherein the first segment extends along a first portion of the edges and wherein the second segment extends along a second distinct portion of the edges, wherein the first segment and the second segment comprise parallel lines, wherein the first portion and the second portion have equal numbers of edges, wherein the plurality of segments collectively extend from the topmost sheet to the bottommost sheet and wherein none of the plurality of segments overlap in a direction parallel to the faces of the sheets.

3. The media of claim 2, wherein the first segment has a first thickness and wherein the second segment has a distinct thickness.

4. The media of claim 2, wherein the first segment and the second segment do not overlap in a direction perpendicular to the faces.

5. The media of claim 2, wherein the first segment and the second segment converge towards one another.

6. The media of claim 2, wherein the first segment has a varying thickness along its length.

7. The media of claim 2, wherein the first segment and the second segment communicate a suggested orientation of the media.

8. The media of claim 2, wherein the first segment and the second segment converge towards one another.

9. A method for visually distinguishing at least one subset of a set of adjacent media edges, the method comprising:

forming a plurality of segments along the set of adjacent media edges of a stack of sheets, the stack having a topmost sheet and a bottommost sheet, the sheets having faces terminating along the edges, wherein said forming includes:

forming a first segment along only a first subset of the set of adjacent media edges of the stack of sheets, wherein the set of adjacent media edges extend along adjacent faces of media and wherein the first segment is oblique to the faces;

forming a second segment along a second subset of the set of adjacent media edges of the stack of sheets, wherein the first segment and the second segment have visually identifiable ends, wherein the first segment and the second segment are parallel, wherein the first subset and the second subset have equal numbers of edges, wherein the plurality of segments collectively extend from the topmost sheet to the bottommost sheet and wherein none of the plurality of segments overlap in a direction parallel to the faces of the sheets.

10. The method of claim 9, wherein the first segment and the second segment have distinct thicknesses.

11. A media comprising:

a stack of unbound sheets providing a set of adjacent edges of material, the stack having a topmost sheet and a bottommost sheet, the sheets having faces terminating along the edges; and a plurality of segment comprising:

a first segment along only a first portion of the set of edges and having a first identifiable end and a second identifiable end, wherein the first segment arcuately extends along the first portion of the set of edges; and a second segment along only a second portion of the set of edges and having a first identifiable end and a second identifiable end, wherein the second segment arcuately extends along the second portion of the set of edges, wherein the plurality of segments collectively extend from the topmost sheet to the bottommost sheet and wherein none of the plurality of segments overlap in a direction parallel to the faces of the sheets.

12. The media of claim 11, wherein the first segment has a concave side opening towards the bottommost sheet and wherein the second segment has a concave side opening towards the topmost sheet.

13. The media of claim 11, wherein the first segment has a concave side opening towards one of the topmost sheet or the bottommost sheet.

14. A media comprising:

a stack of unbound sheets of material having a set of adjacent faces terminating at a set of adjacent edges, the stack having a topmost sheet and a bottommost sheet;

a plurality of segments comprising:

a first segment along only a first portion of the set of edges and having a first identifiable end and a second identifiable end, the first segment extending along the edges oblique to the faces; and a second segment along a second portion of the set of edges and having a first identifiable end and a second identifiable end, the second segment extending along the edges, wherein the first segment has a first color and wherein the second segment has a second different color, wherein the plurality of segments collectively extend from the topmost sheet to the bottommost sheet and wherein none of the plurality of segments overlap in a direction parallel to the faces of the sheets.

15. The media of claim 14, wherein the first segment and the second segment each extend oblique to a face of the stack of sheets.

16. The media of claim 15, wherein the first segment and the second segment extend parallel to one another.

17. A media comprising:

a stack of sheets of material having a set of adjacent faces terminating at a set of adjacent edges, the stack having a topmost sheet and a bottommost sheet;

a plurality of segments comprising:

a first segment extending along a first portion of the set of adjacent edges and having first and second identifiable ends;

a second segment extending along a second portion of the set of adjacent edges having first and second identifiable ends;

the plurality of segments collectively extending from a topmost sheet of the stack of sheets to a bottommost sheet of the stack of sheets on the adjacent edges and wherein none of the plurality of segments overlap in a direction parallel to the faces of the sheets.

18. The media of claim 17, wherein the plurality of segments extend parallel to one another.

19. The media of claim 17, wherein the plurality of segments extend oblique to the faces.

20. The media of claim 19, wherein the plurality of segments have different thicknesses.

21. The media of claim 17, wherein the plurality of segments have different thicknesses.

22. A media comprising:

sheets of material providing a set of adjacent edges of sheets of material arranged in a stack, the stack having a topmost sheet and a bottommost sheet, the sheets having faces terminating along the edges; and a plurality of segments including:

a first segment extending oblique to the faces and along only a first portion of the set of edges and having a first identifiable end and a second identifiable end, the second identifiable end spaced from both the topmost sheet and the bottommost sheet; and a second segment having a first identifiable end and a second identifiable end along a second portion of the set of edges, the second portion including at least a sheet not in the first portion, wherein the plurality of segments collectively extend from the topmost sheet to the bottommost sheet and wherein none of the plurality of segments overlap in a direction parallel to the faces of the sheets.

* * * * *